United States Patent
Middendorf et al.

(10) Patent No.: US 11,263,163 B2
(45) Date of Patent: Mar. 1, 2022

(54) PROCESSING CONTROL OF A SENSOR SYSTEM

(71) Applicant: Robert Bosch GmbH, Stuttgart (DE)

(72) Inventors: Lars Middendorf, Rostock (DE); Sebastian Stieber, Rostock (DE); Rainer Dorsch, Kirchentellinfurt (DE); Christian Haubelt, Kritzmow (DE)

(73) Assignee: Robert Bosch GmbH, Stuttgart (DE)

( * ) Notice: Subject to any disclaimer, the term of this patent is extended or adjusted under 35 U.S.C. 154(b) by 202 days.

(21) Appl. No.: 16/494,798

(22) PCT Filed: Feb. 1, 2018

(86) PCT No.: PCT/EP2018/052466
§ 371 (c)(1),
(2) Date: Sep. 17, 2019

(87) PCT Pub. No.: WO2018/166698
PCT Pub. Date: Sep. 20, 2018

(65) Prior Publication Data
US 2020/0125523 A1    Apr. 23, 2020

(30) Foreign Application Priority Data
Mar. 17, 2017  (DE) .......................... 102017204514.0

(51) Int. Cl.
*G06F 13/40* (2006.01)
(52) U.S. Cl.
CPC ................. *G06F 13/4081* (2013.01)
(58) Field of Classification Search
None
See application file for complete search history.

(56) References Cited

U.S. PATENT DOCUMENTS

| 6,820,259 B1 * | 11/2004 | Kawamata | G06F 8/61 |
| | | | 717/173 |
| 2003/0126311 A1 * | 7/2003 | Kushnirskiy | G06F 9/547 |
| | | | 719/328 |

(Continued)

FOREIGN PATENT DOCUMENTS

| JP | 2015207273 A | 11/2015 |
| WO | 2006091578 A2 | 8/2006 |

(Continued)

OTHER PUBLICATIONS

International Search Report for PCT/EP2018/052466, dated May 7, 2018.

(Continued)

*Primary Examiner* — Idriss N Alrobaye
*Assistant Examiner* — Dayton Lewis-Taylor
(74) *Attorney, Agent, or Firm* — Norton Rose Fulbright US LLP; Gerard Messina

(57) ABSTRACT

A sensor unit includes at least one sensor for detecting and converting measured quantities into sensor signals; at least one microprocessor; at least one memory for program modules for processing sensor signals, the program modules being executable on the microprocessor; and at least one communications interface to an external application processor, the program modules being able to be activated and deactivated via this communications interface, and further program modules are able to be loaded into the memory via this communications interface. The microprocessor includes at least one closed environment for executing plug-in program modules.

15 Claims, 2 Drawing Sheets

(56) References Cited

U.S. PATENT DOCUMENTS

2012/0254878 A1   10/2012  Nachman et al.
2015/0296025 A1* 10/2015  Okabayashi ........ G06F 9/44526
                                                                     709/201

FOREIGN PATENT DOCUMENTS

WO       2014163168 A1   10/2014
WO       2015134937 A1    9/2015

OTHER PUBLICATIONS

Gabriele De Luca et al., "The Use of NFC and Android Technologies to Enable a KNX-Based Smart Home", 21st International Conference on Software. Telecommunications and Computer Networks, (Softcom 2013),2013, pp. 1-7, XP055242918.

* cited by examiner

PROCESSING CONTROL OF A SENSOR SYSTEM

FIELD OF THE INVENTION

The present invention relates to a sensor system. More specifically, the present invention relates to the control of the processing of a sensor system having a built-in processing unit.

BACKGROUND INFORMATION

A sensor system includes a sensor, which is developed to scan a physical quantity, and a processing unit. The processing unit is developed to further process scanned values of the physical quantity and make them available to the outside with the aid of an interface. The sensor and the processing unit are normally installed in a shared housing in order to increase an integration density and to shorten signal paths.

A configuration of the sensor system from the outside can usually be carried out with the aid of configuration messages. For instance, parameters may be modified in the process or individual parts of the sensor system may be activated or deactivated.

US2012/0254878 A1 provides a sensor system in which different function components that are permanently provided in the sensor system are able to be selected from the outside or be linked to one another. A prerequisite is a closed system whose function scope is specified only once prior to the initial operation and afterwards is only configured. An expansion of the function scope is not provided.

In conventional sensor systems a function scope is specified by the components provided in the sensor system. A retroactive modification, or especially an enlargement, of the function scope is not possible. If the sensor system is meant to be used universally, then it will be necessary to provide many different function components, which may increase the production costs. If only a few function components are provided, then the sensor system can be used in fewer different environments. One object on which the present invention is based is to provide an improved sensor system, which is suitable for universal use at the smallest expense possible. Another object is to provide a suitable control method for the sensor system.

SUMMARY

A sensor unit includes at least one sensor for detecting and converting measured quantities into sensor signals; at least one microprocessor; at least one memory for program modules for processing sensor signals, the program modules being able to be executed on the microprocessor; and at least one communications interface to an external application processor, the program modules being able to be activated and deactivated via this communications interface and additional program modules being able to be loaded into the memory via this communications interface. The microprocessor includes at least one closed environment for the execution of plug-in program modules.

The microprocessor may provide at least one virtual machine as a closed environment for the execution of plug-in program modules.

The microprocessor is able to provide at least one sandbox as a closed environment for the execution of plug-in program modules.

A microprocessor may be provided for the purpose of processing sensor signals from a plurality of sensors.

An application processor includes at least one communications interface to a sensor unit, as described earlier. The configuration of the sensor unit and the specific function scope of the closed environment of the microprocessor of the sensor unit is known to the application processor. An access possibility to a non-volatile memory is provided, which stores platform-independent program modules for the processing of sensor signals, and a means is provided for supplying at least one plug-in program module, which is based on at least one platform-independent plug-in and is executable in the closed environment of the microprocessor of the sensor unit. In addition, a means for transmitting such plug-in program modules via the communications interface to the memory of the sensor unit is provided, and a means for activating and deactivating these plug-in program modules via the communications interface.

Denoted here as "configuration of the sensor unit" is information pertaining to the provided sensors, the microprocessor and the memory. The "function scope of the closed environment" describes whether a virtual machine, a sandbox or some other type of closed environment is involved, and also how many program memories are available there. Hereinafter, the platform-independent program modules that the application processor is able to access are always referred to as "plug-ins". They may also be stored on an external memory medium. Denoted as "plug-in program modules" are the program modules that are based on the plug-ins, which are executed in the closed environment of the microprocessor of the sensor unit. If the closed environment involves a virtual machine, then the platform-independent plug-ins may be directly loaded and executed in the virtual machine. The plug-in and the plug-in program module may be essentially identical in this case.

The means for supplying may include means for converting platform-independent plug-ins into at least one plug-in program module in each case, which is executable in the closed environment of the microprocessor of the sensor unit. A compiler of an external application processor, for instance, may be used for the conversion.

The means for converting platform-independent plug-ins into plug-in program modules may be configured in such a way that they carry out a program optimization and/or a compatibility check with regard to the configuration of the sensor unit.

A program optimization is to be understood as a program modification while maintaining the functionality and a simultaneous reduction of the latency, the electrical power consumption and/or the memory requirement. Alternatively, one could also call it an "efficiency increase of the extra-functional properties (latency, electrical power consumption, memory requirement, etc.)".

Means for storing platform-independent plug-ins and/or plug-in program modules based thereon may be provided.

This allows for a local storage, i.e. in the application processor or also in an additional memory medium of the sensor system, of plug-ins and/or the corresponding plug-in program modules once they have been downloaded. In such a case, the plug-ins have to be made available or converted into plug-in program modules only a single time. In addition, the plug-ins or plug-in program modules are able to be used even when access to the memory including the plug-ins is not possible at all times or all locations.

Moreover, the application processor may encompass at least one closed environment for executing platform-independent plug-ins and/or plug-in program modules.

In an advantageous manner, the application processor likewise includes a closed environment for executing plug-ins or plug-in program modules. When a plug-in or plug-in program module is unable to be executed in the closed environment of the microprocessor of the sensor unit, for instance because of an excessive capacity utilization or insufficient capacity, then there is also the alternative of executing it, either entirely or also only partially, in the closed environment of the much more powerful application processor.

Also provided may be means for instrumenting and profiling platform-independent plug-ins and/or plug-in program modules for the identification of plug-in program sections which are able to be executed in the closed environment of the microprocessor of the sensor unit, and means for coordinating these plug-in program sections.

A sensor system includes at least one sensor unit and at least one application processor as described herein, the platform-independent plug-ins being stored in an internal memory of the application processor, on an external memory medium, and/or in a Cloud.

In contrast to the related art, the sensor system according to the present invention is also able to execute platform-independent plug-ins that are made available by external memory media, such as an SD card or a Cloud.

In addition, a method is provided for operating a sensor system developed as described above, in which at least one platform-independent program module is made available to the application processor; in which the application processor provides at least one plug-in program module which is based on the at least one platform-independent plug-in and is able to be executed in the closed environment of the microprocessor of the sensor unit; and in which the at least one plug-in program module is loaded into the memory of the sensor unit and executed in the closed environment of the microprocessor of the sensor unit if the configuration and the status of the sensor unit permit this.

The present method may allow for the use of a closed environment. If the execution of a plug-in or a plug-in program module is performed in such a closed environment on the microprocessor of the sensor unit or on the application processor, then the execution is able to be stopped at any time, in particular when a faulty behavior that interferes with the operation has been detected or is foreseeable. This possibility is a precondition for a "risk-free" download of initially unknown program code.

The application processor is able to convert the at least one platform-independent plug-in into at least one plug-in program module, which is executable in the closed environment of the microprocessor of the sensor unit, and a check takes place as to whether the plug-in program module is compatible with the configuration of the sensor unit.

During the conversion of the at least one platform-independent plug-in into at least one plug-in program module and/or during the execution of the plug-in program module, a program optimization with regard to the configuration and the status of the sensor unit and/or the function scope of the closed environment is able to be undertaken.

The microprocessor of the sensor unit and/or the application processor is/are able to deactivate the plug-in program module when a behavior that is harmful to the sensor system or that interferes with the operation is detected or foreseeable during the execution of the plug-in program module.

The at least one platform-independent plug-in and/or the at least one plug-in program module based thereon is/are able to be stored outside the sensor unit so that it/they may be loaded into the memory of the sensor unit again if the need arises.

The at least one platform-independent plug-in and/or the at least one plug-in program module is/are able to be at least partially executed in a closed environment of the application processor when an execution in the closed environment of the microprocessor of the sensor unit is impossible.

In this way, a function scope of the processing of scanned values is able to be influenced retroactively. More specifically, processing as a function of an intended use of the sensor system is able to be adapted. The adaptation may also be carried out during an ongoing operation, with the result that different types of processing of the scanned values is possible in different situations, for instance.

It is generally preferred that the sensor does not scan any extremely large data quantities so that the processing unit may have a relatively low-capacity and economical design. The closer to the actual sensor the processing of values is carried out, the more current is able to be saved during the processing. An energy expenditure may increase with each transmission of partially processed information from one processing unit to another, increase factors of approximately 10 being common in this context. For example, the sensor may include a temperature sensor, a moisture sensor or a sensor for volatile organic compounds (VOC). Toward this end, the sensor may be constructed in semiconductor technology, in particular. The processing unit is preferably also developed in semiconductor technology, and it is possible to use the same or a different semiconductor technology in this context.

In addition, it is preferred that the sensor includes a micromechanical sensor. Such sensors may require a processing unit for carrying out the measurement with the aid of the sensor. For example, an equilibrium of a micromechanical component may be adjusted or a mechanical excitation be carried out for this purpose. The processing unit is able to convert occurring analog measured values into digital values and process them further. Algorithmic processing or processing that is controlled on the basis of a characteristics map may be performed in this context.

The sensor may include an inertial sensor, in particular. More specifically, the inertial sensor may include a micromechanical acceleration sensor or yaw rate sensor. The processing unit is preferably developed to determine a predefined movement of the sensor system. For example, the sensor system may be intended to be fixed in place in a shoe, and the predefined movement includes a step of a person wearing the shoe. In another specific embodiment, the sensor system is developed to be installed in a mobile phone, in which case the movement includes a gesture. The predefined movement is able to be detected in an optimized manner with the aid of the sensor system, and the used processing unit may have a current-saving design. A processing unit connected to the sensor system usually has far greater processing capacities and requires more electrical energy for the same determination. The loading of the external processing unit is better able to be reduced so that it may be put into an energy-saving mode or be used for other purposes.

It is particularly preferred that the processing unit provides a closed environment for the execution of method instructions received via the interface. A virtual machine or a sandbox, for example, may be used for this purpose. A virtual machine is an execution environment for programs that are made available by a host machine with the aid of a corresponding program. Conditions within the virtual machine such as an identifiable hardware configuration are able to be controlled by the host machine. A sandbox generally denotes an isolated area of a processing system within which executed measures have no effect on the external environment. The closed environment makes it possible to prevent malicious or faulty processing instructions from causing damage to the sensor system or from reducing its usability.

It is furthermore preferred that the processing unit is developed to execute processing instructions of a predefined quantity, the closed environment preventing the execution of a partial quantity of the predefined quantity. For example, the processing instructions may be subdivided into privileged and non-privileged instructions. Privileged processing instructions can be executed by the processing unit only if they were not previously received via the interface. Privileged instructions, for example, may encompass a direct access to a configuration of the sensor or its control. If a previously uploaded processing instruction attempts to execute a privileged command, then its execution is able to be interrupted or the harmful command or the surrounding program be removed.

In one further preferred specific embodiment, the sensor system also includes a local memory for the storage of received processing instructions, the processing unit being developed to remove previously received processing instructions from the memory. Instructions that are no longer required may thereby be deleted or discarded so that the local memory has more free space available for accepting additional processing instructions. As a result, the sensor system is particularly not only programmable once from the outside, but also able to receive or modify its processing program in a dynamic manner. A large function variety of the sensor system is therefore achievable even when a relatively small local memory is used.

A method for controlling the described sensor system includes steps of providing processing instructions to the sensor system using the interface, and receiving a processed value determined on the basis of physical measured values with the aid of the interface.

The processing instructions are able to be dynamically uploaded to the sensor system and executed there as a function of a situation, a measuring task or some other circumstance. A value processed or preprocessed with the aid of the uploaded processing instructions is then able to be picked up outside the sensor system. A processing system connected to the sensor system is therefore better able to carry out higher-level tasks, and processing close to the measured value is able to be partially or fully carried out by the sensor system.

It is preferred that a description of an environment of processing instructions executable by the sensor system is predefined. The processing instructions are able to be made available to the sensor system only if the sensor system is developed for their execution. For example, different sensor systems whose environments form partial quantities of one another may be provided. Processing instructions that are encompassed by the smaller partial quantity are able to be processed by both sensor systems. This makes it possible to set up programs of processing instructions that are able to run on different sensor systems. On the other hand, programs that exploit the possibilities of a predefined sensor system in a more optimal manner may be set up as well.

If the sensor system is not developed to execute the processing instructions, then scanned values of the physical quantity are able to be received with the aid of the interface and processed outside the sensor system. For example, the previously not uploaded processing instructions may be executed using the external processing unit. In other words, a program that is unable to be uploaded to a given sensor system is also able to be carried out by an internal processing unit itself. This may require a higher current amount in comparison with an execution by the sensor system, but the actual processing goal is better able to be achieved.

In a first variant, the description of the environment is available in the sensor system and may be supplied with the aid of the interface. An external processing unit may download the description if required and check whether or not a predefined program is able to run on the sensor system. In another specific embodiment, the description is available externally so that it is able to be updated or adapted in a more optimal manner.

BRIEF DESCRIPTION OF THE DRAWINGS

FIG. 1 shows a system 100 having a sensor system 105 and a processing system 110, which are connected to each other with the aid of an interface 115. Sensor system 105 includes a sensor 118, a processing unit 120 and optionally also a memory 125. Processing unit 120 preferably includes a programmable microcomputer or microprocessor and is able to provide a closed processing environment 121 for the control of sensor system 105. Processing unit 120 is connected to sensor 118 and interface 115. Memory 125 is connected to processing unit 120 and optionally may be read or written to with the aid of a direct access 130 (DMA: direct memory access) by way of interface 115.

Figure 1:
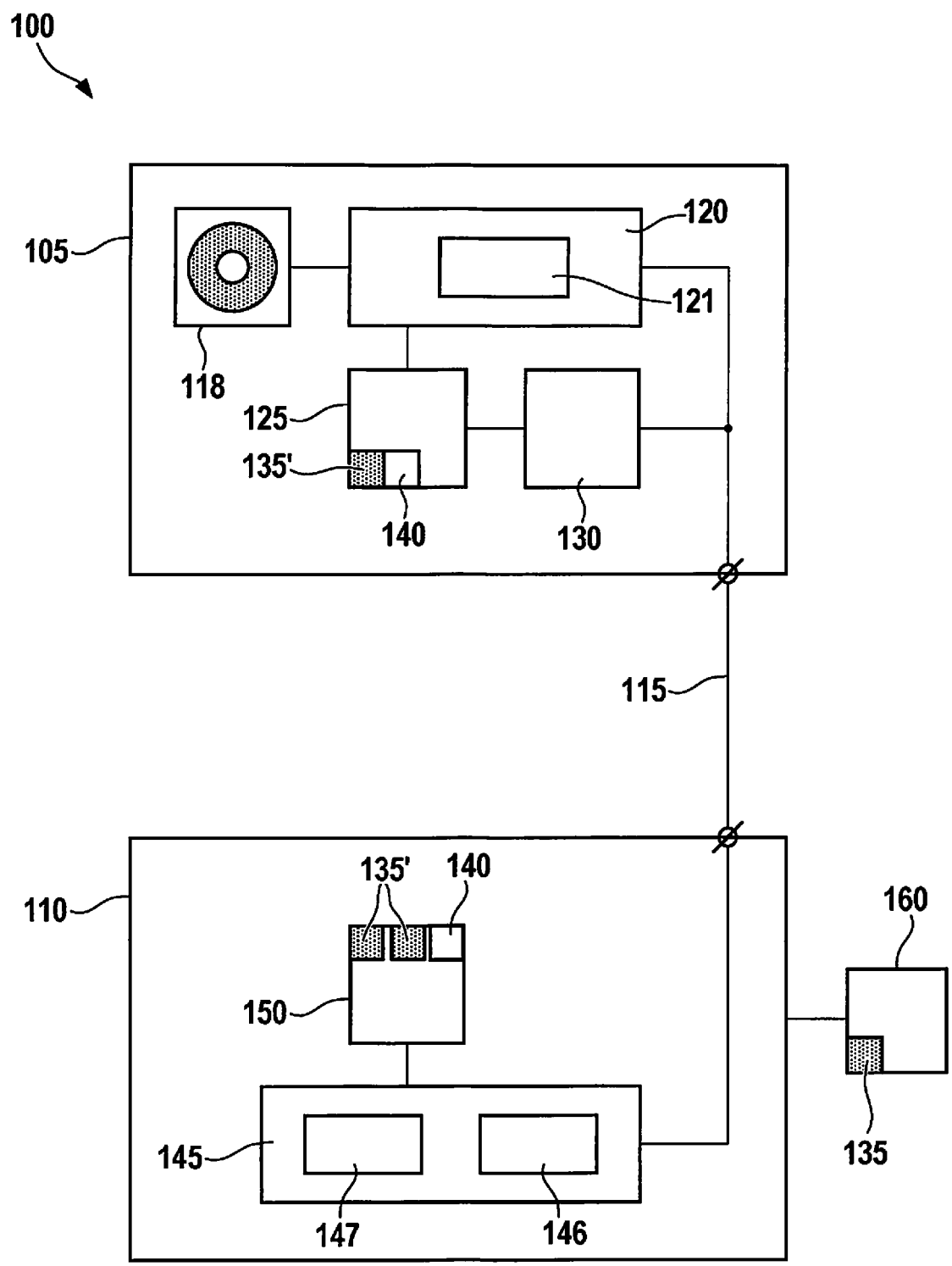
FIG. 1 shows a system.

Sensor 118 is preferably an inertial sensor and, independently thereof, preferably a micromechanical sensor (microelectromechanical system, MEMS). Processing unit 120 may be developed to control a measuring operation with the aid of sensor 118. In another specific embodiment, a dedicated further processing unit is provided for this purpose. To control the measuring operation, certain physical conditions (an equilibrium, an oscillation, a bias voltage), for example, may be generated or a measuring value be scanned and possibly preprocessed. Values of a physical quantity scanned with the aid of sensor 118, such as an acceleration or a yaw rate, are able to be further processed by processing unit 120. In particular, a characteristic of the scanned values over time is able to be determined for this purpose and the characteristic may then be examined with regard to a similarity to a predefined characteristic, which may be characteristic of a movement to be detected, such as a step or a hand motion, for example.

To process scanned values, processing unit 120 is developed to execute a program that implements a processing method on processing unit 120. The program is normally stored in memory 125. Toward this end, memory 125 may have a plurality of areas that may be read or written to under different conditions or with different rights. Scanned values of the physical quantity are able to be made available either to the outside, with the aid of interface 115, or loaded into memory 125, from where they may then be downloaded through direct access 130 (direct memory access, DMA) via interface 115. As a rule, it is also possible to communicate with processing unit 120 from the outside via interface 115, e.g. in order to modify a processing parameter or to transmit a request for an activity such as the retrieval of values from memory 115.

It is provided that a plug-in program module 135', which controls the processing of the scanned values of sensor 118, is able to be uploaded via interface 115 into sensor system 105. It is furthermore preferred in this context that an uploaded plug-in program module 135' is restricted to the use of a predefined processing environment 121 of sensor system 105.

Processing environment 121 for plug-in program module 135' is preferably restricted so that plug-in program module 135' is able to exploit only part of the full control or processing possibilities of processing unit 120 or sensor system 105. In addition, processing environment 121 is preferably closed so that plug-in program module 135' is unable to leave processing environment 121 and, in particular, is unable to obtain any additional privileges. A description 140 of processing environment 121 for plug-in program module 135' is stored in memory 125 in one specific embodiment and may be retrieved, for instance with the aid of direct access 130, via interface 115. Plug-in program module 135' is able to be loaded into memory 125 via an interface 115, in particular through direct access 130. The execution or configuration of plug-in program module 135' is able to be controlled in the same way or by a communication with processing unit 120.

Further processing unit 145 is able to supply at least one means 146 for supplying and possibly converting platform-independent plug-ins 135 into plug-in program modules 135', and/or at least one closed processing environment 147. Processing environment 147 may correspond to processing environment 121 of processing unit 110 of sensor system 105. In addition, an external memory 160 may be provided in processing system 110, in which platform-independent plug-ins and/or plug-in program modules may be stored. External memory 160 may include a removable memory medium.

Sensor system 105 is developed for a connection to processing system 110. Processing system 110 normally constitutes a higher level and frequently includes a further processing unit 145, which is generally much more powerful than that of sensor system 105. For example, sensor system 105 and processing system 110 may be encompassed by a shared device such as a mobile phone, and processing system 110 may be developed to control numerous further functions of the mobile phone, e.g., a recording or display of images or the execution of a wireless communication. It is preferred that processing system 110 includes an additional memory 150.

Processing system 110 may provide one or more plug-in program modules 135', of which it may select one and upload it via interface 115 to sensor system 105. In addition, description 140 of the environment for a plug-in program module 135' of sensor system 105 is able to be provided by processing system 110.

Processing system 110 may preferably also be developed to select a plug-in program module 135', e.g., as a function of an event, a situation or available resources, to upload it to sensor system 105 and to control its execution. A previously uploaded plug-in program module 135' is able to be deleted or declared invalid by processing system 110 in sensor system 105. Prior to the uploading, processing system 110 may check whether plug-in 135 or plug-in program module 135' fits description 140. If this is not the case, plug-in 135 is able to be adapted to description 140 so that a plug-in program module 135' is created, or so that a local execution of plug-in 135 by further processing unit 145 is able to be carried out. In one further specific embodiment, it is also possible to load part of a plug-in 135 as plug-in program module 135' into sensor system 105 and execute it there, while another part is executed in processing system 110. The communication between the parts of plug-in 135 is preferably carried out with the aid of interface 115.

Figure 2:
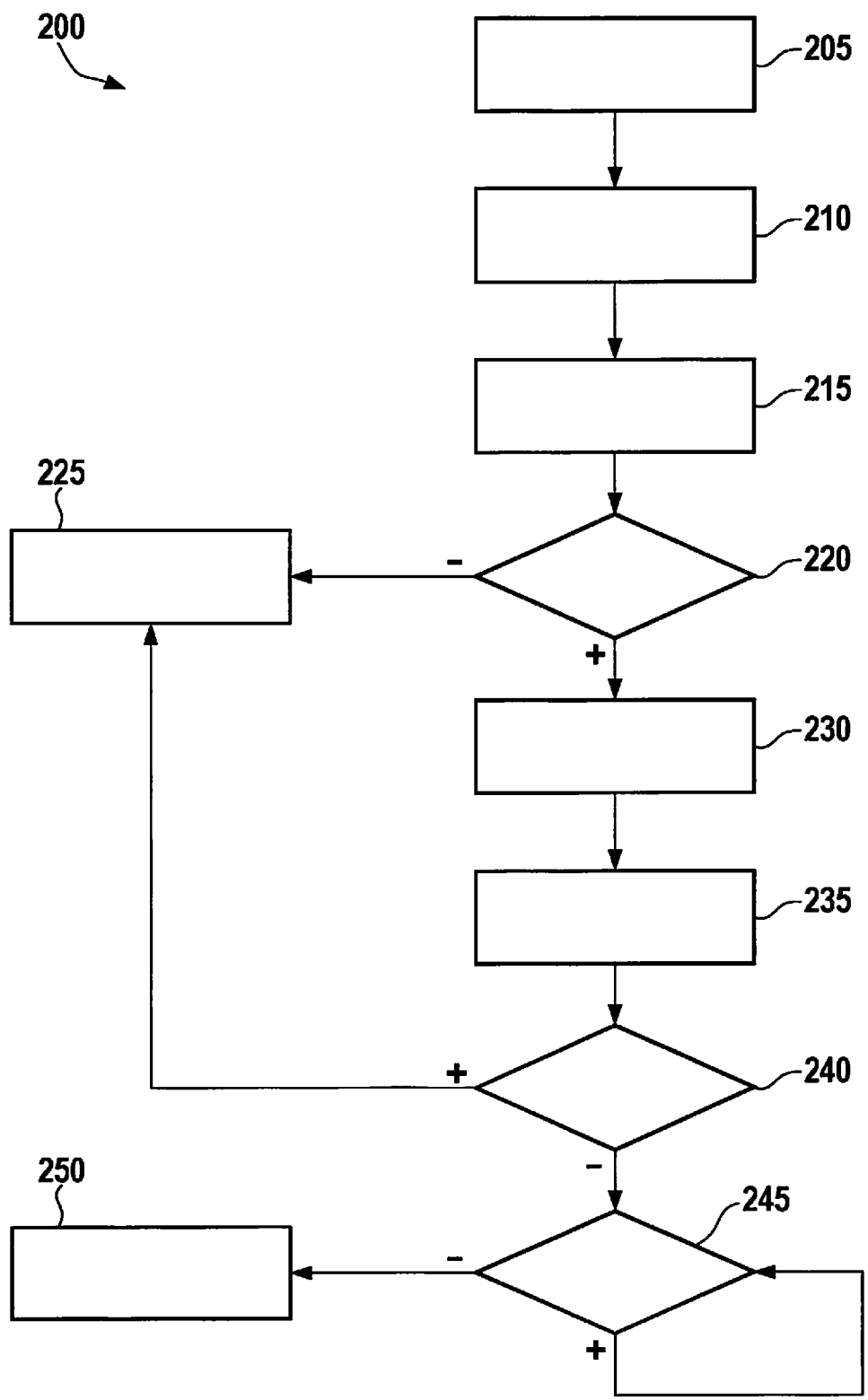
FIG. 2 shows a flow diagram of a method for controlling a sensor system.

FIG. 2 shows a flow diagram of a method 200 for controlling sensor system 105 from FIG. 1. Method 200 is able to be executed on one or a plurality of components of system 100 from FIG. 1. Toward this end, method 200 may be available in the form of one or a plurality of computer program products, which is/are set up to be executed on allocated processing units 120, 145. Features or advantages pertaining to method 200 may thus be related to system 100, and vice versa.

In a step 205, a plug-in 135 is detected by processing system 110 or brought into further memory 150. In one variant, multiple plug-ins 135 are present and a selection is made, for instance based on a situation, a measured value or some other criterion.

In a step 210, selected plug-in 135 is optionally able to be optimized in addition. It may be parameterized, in particular, or unused parts may be removed in this manner.

In a step 215, a compatibility of selected plug-in 135 with the environment in which it is to be executed on sensor system 105 is checked. Toward this end, plug-in 135 is preferably compared to description 140 of processing environment 121 supported by sensor system 105. If necessary, description 140 may first be downloaded by sensor system 105 for this purpose.

If it is determined in a step 220 that selected plug-in 135 or plug-in program module 135' is incompatible with the environment, then it is able to be locally executed by processing system 110 in a step 225. To do so, processing system 110 may provide or emulate an environment required for the execution. Under these circumstances, sensor system 105 may be configured to supply the scanned values required for the execution of plug-in program module 135' via interface 115.

In the other case, plug-in program module 135' is preferably transmitted to sensor system 105 in a step 230. In a step 235, plug-in program module 135' is received by sensor system 105 and possibly stored in memory 125 prior to being executed. The execution may also require an explicit activation or enabling, which is transmittable in the form of a message or request of processing system 110 via interface 115.

In a step 240, it may be checked whether an error has occurred in the execution of plug-in program module 135' on sensor system 105. For example, an error may occur when a processing instruction of plug-in program module 135' attempts to access a protected memory area or to carry out a function that is privileged in some other way. If an error was detected or if an error is foreseeable, then branching to step 225 may take place, in which plug-in program module 135' is stopped, removed or activated for the local execution on processing system 110. In the other case, it may be checked in a step 245, in particular periodically, whether uploaded plug-in program module 135' is still required in sensor system 105. If this is not the case, then plug-in program module 135' is able to be deactivated in a step 250.

What is claimed is:

1. A sensor unit, comprising:
   at least one sensor for detecting and converting a measured quantity into a sensor signal;
   at least one microprocessor;
   at least one memory for a program module for processing the sensor signals, the program module being able to be executed on the microprocessor; and at least one communications interface to an external application processor, wherein:
the program module is able to be activated and deactivated via the communications interface,
an additional program module corresponding to a plug-in program module is able to be loaded into the memory via the communications interface, and
the microprocessor includes at least one closed environment for executing the plug-in program module and the microprocessor is configured to convert a platform-independent plug-in program module into the plug-in program module,
wherein at least one of the platform-independent plug-in program module and the at least one plug-in program module is one of:
stored outside the sensor unit so that the at least one of the platform-independent plug-in program module and the plug-in program module is able to be loaded into the memory of the sensor unit again if required; or
at least partially executed in a second closed environment of the application processor when an execution in the closed environment of the microprocessor of the sensor unit is impossible.

2. The sensor unit as recited in claim 1, wherein microprocessor provides at least one virtual machine as the closed environment for executing the plug-in program module.

3. The sensor unit as recited in claim 1, wherein the microprocessor provides at least one sandbox as the closed environment for executing the plug-in program module.

4. The sensor unit as recited in claim 1, wherein the microprocessor is a hub processor for processing the sensor signal and at least one other sensor signal from the sensor and at least one other sensor.

5. An application processor, comprising:
at least one communications interface to a sensor unit that includes:
at least one sensor for detecting and converting a measured quantity into a sensor signal;
at least one microprocessor,
at least one memory for a program module for processing the sensor signals, the program module being able to be executed on the microprocessor, and
at least one communications interface to an external application processor, wherein:
the program module is able to be activated and deactivated via the communications interface,
an additional program module corresponding to a plug-in module is able to be loaded into the memory via the communications interface to the external application processor,
the microprocessor includes at least one closed environment for executing a plug-in program module,
the application processor includes knowledge of a configuration of the
sensor unit and a specific function scope of the closed environment of the microprocessor of the sensor unit, and
an access possibility to a non-volatile memory is provided, in which a platform-independent program module corresponding to a platform-independent plug-in program module for the processing of the sensor signal is stored;
a supplier configured for supplying at least one further plug-in program module that is based on the platform-independent program plug-in program module and is executable in the closed environment of the microprocessor of the sensor unit,
a transmitter configured for transmitting to the memory of the sensor unit the at least one further plug-in program module via the communications interface to the sensor unit; and
an activator/deactivator configured for activating and deactivating the at least one further plug-in program module via the communications interface to the sensor unit.

6. The application processor as recited in claim 5, wherein the supplier configured for supplying includes a convertor configured for converting the platform-independent plug-in program module into the at least one further plug-in program module that is executable in the closed environment of the microprocessor of the sensor unit.

7. The application processor as recited in claim 6, wherein the convertor configured for converting the platform-independent plug-in program module into the at least one further plug-in program module is configured in such a way that the convertor configured for converting the platform-independent plug-in program module carries out at least one of a program optimization and a compatibility check with regard to the configuration of the sensor unit.

8. The application processor as recited in claim 5, further comprising a storing device configured for storing at least one of the platform-independent plug-in program module and the at least one further plug-in program module.

9. The application processor as recited in claim 5, further comprising at least one further closed environment for executing at least one of the platform-independent plug-in program module and the at least one further plug-in program module.

10. The application processor as recited in claim 9, further comprising:
a profiler configured for instrumenting and profiling at least one of the platform-independent plug-in program module and the at least one further plug-in program module for identification of plug-in program sections capable of being executed in the closed environment of the microprocessor of the sensor unit; and
a coordinator configured for coordinating the plug-in program sections.

11. A sensor system, comprising:
at least one sensor unit that includes:
at least one sensor for detecting and converting a measured quantity into a sensor signal;
at least one microprocessor;
at least one memory for a program module for processing the sensor signals, the program module being able to be executed on the microprocessor; and
at least one communications interface to an external application processor, wherein:
the program module is able to be activated and deactivated via the communications interface,
an additional program module corresponding to a plug-in module is able to be loaded into the memory via the communications interface, and the microprocessor includes at least one closed environment for executing the plug-in program module; and
at least one application processor that includes:
at least one communications interface to the sensor unit, the application processor including knowledge of a configuration of the sensor unit and a specific function scope of the closed environment of the microprocessor of the sensor unit, and an access possibility to a non-volatile memory being provided, in which a platform-independent program module corresponding to a platform-independent plug-in program module for the processing of the sensor signal is stored;

a supplier configured for supplying at least one further plug-in program module that is based on the platform-independent plug-in program module and is executable in the closed environment of the microprocessor of the sensor unit;

a transmitter configured for transmitting to the memory of the sensor unit the at least one further plug-in program module via the communications interface to the sensor unit; and an activator/deactivator configured for activating and deactivating the at least one further plug-in program module via the communications interface to the sensor unit, wherein:

the at least one further platform-independent plug-in is stored in at least one of an internal memory of the application processor, an external memory medium, and a Cloud.

12. A method for operating a sensor system, comprising:
providing at least one platform-independent plug-in program module in an application processor, wherein:

the application processor provides at least one further plug-in program module that is based on the at least one platform-independent plug-in program module and is able to be executed in a closed environment of a microprocessor of a sensor unit of the sensor system, and the at least one further plug-in program module is loaded into a memory of a sensor unit of the sensor system and executed in the closed environment of the microprocessor of the sensor unit if a configuration and a status of the sensor unit permit execution of the at least one further plug-in program module;

wherein at least one of the at least one platform-independent plug-in program module and the at least one plug-in program module is one of:

stored outside the sensor unit so that the at least one of the at least one platform-independent plug-in module and the at least one further plug-in program module is able to be loaded into the memory of the sensor unit again if required; or at least partially executed in a second closed environment of the application processor when an execution in the closed environment of the microprocessor of the sensor unit is impossible.

13. The method as recited in claim 12, wherein the application processor converts the at least one platform-independent plug-in program module into the at least one further plug-in program module, the at least one further plug-in program module being executable in the closed environment of the microprocessor of the sensor unit, and wherein check is performed whether the at least one further plug-in program module is compatible with the configuration of the sensor unit.

14. The method as recited in claim 13, wherein at least one of during a conversion of the at least one platform-independent plug-in program module into the at least one further plug-in program module and during an execution of the at least one further plug-in program module, a program optimization with regard to at least one of the configuration and the status of the sensor unit, and a function scope of the closed environment is carried out.

15. The method as recited in claim 12, wherein the at least one further plug-in program module is deactivated by at least one of the microprocessor of the sensor unit and the application processor when a behavior that is one of harmful to the sensor system and interferes with an operation is one of detected and foreseeable during execution of the at least one further plug-in program module.

\* \* \* \* \*